United States Patent
Kielian et al.

(10) Patent No.: US 8,690,646 B1
(45) Date of Patent: Apr. 8, 2014

(54) FISH SKINNER

(75) Inventors: Chris Kielian, Plattsmouth, NE (US); Brian Kielian, La Vista, NE (US); Perry Parks, Papillion, NE (US); Eric Parks, Papillion, NE (US)

(73) Assignee: Ultimate Fishing Gear, Inc., La Vista, NE (US)

( * ) Notice: Subject to any disclaimer, the term of this patent is extended or adjusted under 35 U.S.C. 154(b) by 0 days.

(21) Appl. No.: 13/601,047

(22) Filed: Aug. 31, 2012

Related U.S. Application Data

(60) Provisional application No. 61/530,865, filed on Sep. 2, 2011.

(51) Int. Cl.
*A22B 5/16* (2006.01)

(52) U.S. Cl.
USPC ........................................ 452/125

(58) Field of Classification Search
USPC ............. 452/125, 127–130, 6, 102–105, 132, 452/133
See application file for complete search history.

(56) References Cited

U.S. PATENT DOCUMENTS

| | | | | |
|---|---|---|---|---|
| 2,547,237 A | * | 4/1951 | Townsend | 452/132 |
| 3,164,858 A | * | 1/1965 | De Moss | 452/127 |
| 3,328,834 A | * | 7/1967 | Pulcifer | 452/101 |
| 3,590,424 A | * | 7/1971 | Shults | 452/101 |
| 3,683,456 A | * | 8/1972 | Beasley | 452/132 |
| 3,872,544 A | * | 3/1975 | Lange | 452/101 |
| 4,063,332 A | * | 12/1977 | McCullough | 452/133 |
| 4,162,558 A | * | 7/1979 | Rubio | 452/101 |
| 4,186,461 A | * | 2/1980 | Leining | 452/133 |
| 4,451,953 A | * | 6/1984 | Leining | 452/133 |
| 4,631,780 A | * | 12/1986 | Leining | 452/133 |
| 4,667,372 A | * | 5/1987 | Till | 452/101 |
| 5,221,229 A | * | 6/1993 | Brophy | 452/105 |
| 5,429,548 A | * | 7/1995 | Long et al. | 452/127 |
| 5,476,417 A | * | 12/1995 | Long et al. | 452/127 |
| 5,630,750 A | * | 5/1997 | Byrd | 452/101 |
| 5,813,904 A | * | 9/1998 | Aslanis et al. | 452/133 |
| 6,497,615 B1 | * | 12/2002 | Klager | 452/101 |
| 7,618,308 B1 | * | 11/2009 | Hernandez | 452/99 |
| 2003/0143939 A1 | * | 7/2003 | Barlow et al. | 452/101 |
| 2007/0123156 A1 | * | 5/2007 | Shipman | 452/135 |

\* cited by examiner

*Primary Examiner* — Richard Price, Jr.
(74) *Attorney, Agent, or Firm* — Advent, LLP

(57) ABSTRACT

A fish skinning device is disclosed. In one or more implementations, the fish skinning device includes a support body, a drive shaft configured to rotate with respect to the support body; a roller connected to the drive shaft; a blade support pivotally connected to the support body; a blade connected to the blade support; and a lever fixedly connected to the blade support for pivoting the blade support about the support body between a first position where the blade is adjacent the roller and at least substantially parallel with the roller, and a second position where the blade is pivoted away from the roller with respect to the first position.

1 Claim, 1 Drawing Sheet

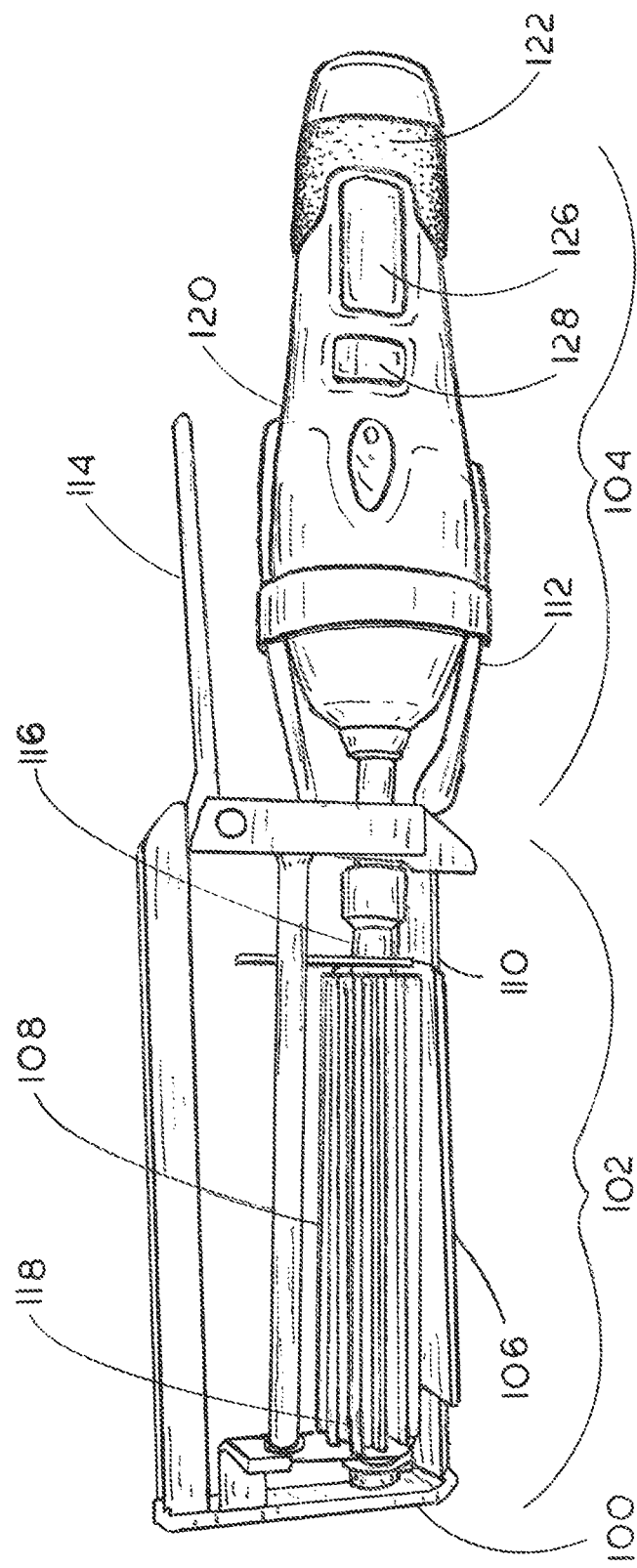

FISH SKINNER

CROSS-REFERENCE TO RELATED APPLICATIONS

The present application claims the benefit under 35 U.S.C. §119(e) of U.S. Provisional Application Ser. No. 61/530,865, filed Sep. 2, 2011, and titled "FISH SKINNER". U.S. Provisional Application Ser. No. 61/530,865 is herein incorporated by reference in its entirety.

BACKGROUND

During preparation of fish, particularly fresh water fish such as Walleye, perch, crappie, blue gill, bass, Northern Pike, and so forth for cooking, the skin and/or scales of the fish may be removed. Typically, fish are "skinned" (e.g., the skin of the fish is removed from the flesh) using a knife to cut the skin from the flesh of the fish.

SUMMARY

A fish skinning device is disclosed. In one or more implementations, the fish skinning device includes a support body, a drive shaft configured to rotate with respect to the support body; a roller connected to the drive shaft; a blade support pivotally connected to the support body; a blade connected to the blade support; and a lever fixedly connected to the blade support for pivoting the blade support about the support body between a first position where the blade is adjacent the roller and at least substantially parallel with the roller, and a second position where the blade is pivoted away from the roller with respect to the first position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description is described with reference to the accompanying figures. The use of the same reference numbers in different instances in the description and the figures may indicate similar or identical items.

FIG. 1 is a side elevation view illustrating a fish skinning assembly in accordance with an example implementation of the present disclosure.

DETAILED DESCRIPTION

Example Implementations

FIG. 1 illustrate illustrates fish skinning devices in accordance with example implementations of the present disclosure. A fish skinning device can be used to separate skin from the meat of fish including, but not limited to: fresh water fish, such as Walleye, perch, crappie, blue gill, bass, and Northern Pike. In implementations, the fish skinning device may be heat resistant, water resistant, and/or waterproof. For example, the fish skinning device may be constructed from materials such as, but not limited to: stainless steel, aluminum, and/or plastic (e.g., the fish skinning device can use stainless steel bearings, and so forth). As shown, a fish skinning device can be implemented as a fish skinning assembly 100 including a skinning portion 102, and a power portion 104 for powering the skinning portion 102. The skinning portion 102 may be attachable to and removable from the power portion 104, using quick-connect hardware, and the like. For example, the skinning portion 102 may comprise an attachment for the power portion 104. The fish skinning assembly 100 can also include other attachments for the power portion 104, such as filleting attachments, as so forth.

The skinning portion 102 may include a blade 106 and a roller 108 disposed adjacent the blade 106. The blade 106 may be connected to a blade support 110 pivotally connected to a support body 112. The support body 112 may be connectable to an end of the power portion 104. The skinning portion 102 may also include a lever 114 fixedly connected to the blade support 110 for pivoting the blade support 110 about the support body 112. For example, the lever 114 may be used to pivot the blade support 110 between one position, where the blade 106 is generally parallel with the roller 108, and another position, where the blade 106 is generally pivoted away from the roller 108.

In one specific instance, the blade 106 may be four and one-half inches (4½ in) long. In other instances, the blade 106 can be about five and one-half to six inches (5½-6 in) long. The blade support 110 may be biased for pivoting the blade 106 away from the roller 108. For example, the blade support 110 can be spring loaded and/or gravity biased away from the roller 108. Thus, the blade 106 can be moved closer to the roller 108 by gripping the lever 114 and squeezing. Further, as more force is exerted on the lever 114, the force of the blade against the roller 108 can be increased. In one specific example, two ounces (2 oz) of force may be required at generally near the middle of the lever 114 to move the blade 106 in contact with the roller 108.

The roller 108 may be connected to a drive shaft 116 extending longitudinally from and connectable to the power portion 104. The drive shaft 116 is configured to be rotated with respect to the support body 112, turning the roller 108 and drawing the skin of a fish into a space between the roller 108 and the blade 106, so that the blade 106 separates a layer of material (e.g., skin) from the meat of a fish. The roller 108 may include grooves 118, and in one specific instance, may have a diameter of about one and one-half inches (1½ in). In one specific instance, the roller 108 can be about five and one-half inches (5½ in) long. In other instances, the roller 108 can be about seven inches (7 in) long. However, these values are provided by way of example only and are not meant to be restrictive of the present disclosure. Thus, rollers and/or blades having other dimensions can be used in accordance with the present disclosure.

The power portion 104 may be configured to connect to the skinning portion 102 using friction, fasteners, and/or quick-connect hardware, such as but not limited to: snap-type fasteners, clips, and so forth. For example, the support body 112 can be fastened to the handle 120 using screws. The power portion 104 may include a handle 120 for holding the fish skinning assembly 100. The handle 120 can be coaxial with the roller 108, or may be within one-half inches (½ inches) of the axis of rotation of the roller 108. The handle 120 may include a handgrip 122, providing a surface for grasping and retaining the handle 120 in the hand of an operator. For example, the hand grip 122 may be textured, or may be formed from a pliable material, such as a flexible membrane material having a soft touch feel. In implementations, the handgrip 122 extends to cover a portion of the handle 120 sized for the hand of a typical operator, such as an adult human. The handle 120 can configured to be ambidextrous (i.e., operable by both left-handed and right-handed operators).

The power portion 104 may also include a motor housed in the handle 120 for driving the roller 108 (e.g., via the drive shaft 116). For example, the drive shaft 116 can be connected to the motor using a chuck/collet-type connector included on an output shaft of the motor. In implementations, the motor can provide up to about eighty inch-pounds (80 in-lbs) of torque, and can operate at speeds between about one hundred eighty revolutions per minute and four hundred revolutions per minute (180-400 RPM). The motor may be operable to move material through the fish skinning assembly 100 at speeds of between about two hundred eighty inches per minute and six hundred fifty inches per minute (280-650 in/min). It should be noted that these values are provided by way of example only and are not meant to be restrictive of the present disclosure. Thus, the fish skinning assembly 100 may include a motor having different torque and/or speed ratings.

The handle 120 may include a switch 126 configured to control a flow of electrical current for powering the motor. For example, the switch 126 may comprise a manually operated electromechanical component having electrical contacts. The switch 126 can be operated to place the contacts in various states. For example, the contacts can be placed in an "on" position (i.e., a closed state where electrical current can flow to the motor), or in an "off" position (i.e., an open state where the switch is non-conducting). In one specific implementation, the switch 126 can be activated with a pressure of one ounce (1 oz). In implementations, the mechanism actuating the transition between the open and closed states of the switch 126 can be a toggle-type switch (flip-for continuous "on" or "off") or a momentary-type switch (push-for "on"). Further, a locking mechanism, such as a toggle switch lock 128, can be included with a momentary-type switch to lock the switch in the "on" position or in the "off" position. In some instances, the switch 126 may be operable to control the rotational speed of the motor. For example, the switch 126 can be implemented as a trigger-type switch, providing a variable speed trigger for controlling the speed of the motor.

The switch 126 can be implemented with an interlock-type switch connected to the blade support 110 and/or the lever 114, so that the switch 126 is not operable to activate the motor unless the blade 106 is moved toward the roller 108 by action of the lever 114. Thus, the fish skinning assembly 100 may include an "operator-presence" type switch that must be depressed in combination with the switch 126 in order to maintain power to the motor. In this manner, the motor can be configured to stop if an operator lets go of the handle 120 and/or the lever 114. In some implementations, the operator-presence switch can be implemented as a momentary-type switch positioned for an operator's thumb when gripping the handle 120, while switch 126 is positioned for an operator's finger(s) (e.g., on an opposite side of the handle 120).

In implementations, the motor can be powered using one or more electrochemical cells/batteries housed in the power portion 104, which may include rechargeable batteries, disposable batteries, and so forth. In other implementations, the motor can be powered via an external electrical connection, such as a connection to one hundred ten Volt (110 V) AC mains. In still further implementations, the motor can be powered via an automotive power receptacle, such as a cigarette lighter receptacle and/or a twelve Volt (12 V) auxiliary power receptacle. For example, the fish skinning assembly 100 can include a cigarette lighter adapter plug. However, these power sources are provided by way of example only and are not meant to be restrictive of the present disclosure. Thus, the motor can be powered using other power sources, including other types of electrical connections, power sources, and so forth.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A fish skinning device comprising:
a support body having a longitudinal axis;
a drive shaft extending from the support body along the longitudinal axis, the drive shaft configured to rotate with respect to the support body;
a roller connected to the drive shaft along the longitudinal axis;
a blade support pivotally connected to the support body;
a blade connected to the blade support; and
a lever fixedly connected to the blade support for pivoting the blade support about the support body between a first position where the blade is adjacent the roller and at least substantially parallel with the roller, and a second position where the blade is pivoted away from the roller at an angle with respect to the longitudinal axis.

* * * * *